Inventor
Justin Lebovici
By his Attorneys
Edwards, Sager & Bower

Jan. 13, 1925.

J. LEBOVICI 1,522,637

INDUCTION MOTOR

Filed Aug. 25, 1921  2 Sheets-Sheet 2

Inventor
Justin Lebovici
By his Attorneys
Edwards, Sager & Bower

Patented Jan. 13, 1925.

1,522,637

UNITED STATES PATENT OFFICE.

JUSTIN LEBOVICI, OF OAKLEY, OHIO, ASSIGNOR TO THE TRIUMPH ELECTRIC COMPANY, A CORPORATION OF OHIO.

INDUCTION MOTOR.

Application filed August 25, 1921. Serial No. 495,335.

*To all whom it may concern:*

Be it known that I, JUSTIN LEBOVICI, a citizen of United States, residing at Oakley, in the county of Hamilton and State of Ohio, have invented certain new and useful Improvements in Induction Motors, of which the following is a specification.

This invention relates to alternating current motors and particularly to self-starting motors of the induction type.

The particular objects of this invention are to provide an improved construction of motor which will have high starting torque with a comparatively small starting current; to provide a motor which will have a higher power factor in starting than is obtainable with prior constructions; and also to provide a motor which may be connected to the supply line while stationary or while operating at low speeds, an increased length of time than is permissible with prior constructions without injury to the motor. Other objects and advantages of my invention will be understood from the following disclosure.

In my invention the stator of the motor may be of the usual form of construction and have the usual phase windings, but the rotor is provided with two sets of windings, one of which is depended upon for the initial starting of the motor and the other of which is made effective upon the motor attaining a predetermined speed. During normal operation all of the windings cooperate and result in the motor having a high efficiency and low slip during running conditions and a low resistance rotor.

My invention will be understood by those skilled in the art from the following description and accompanying drawings which illustrate preferred embodiments thereof.

Figure 1:
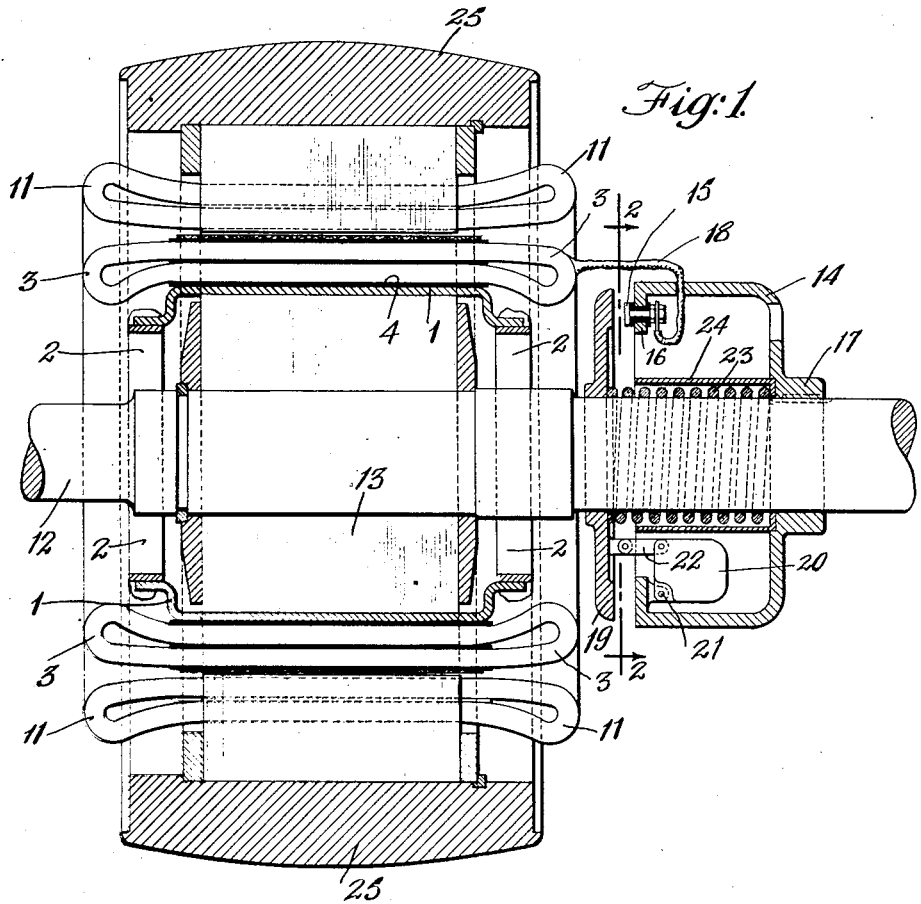
Figure 2:
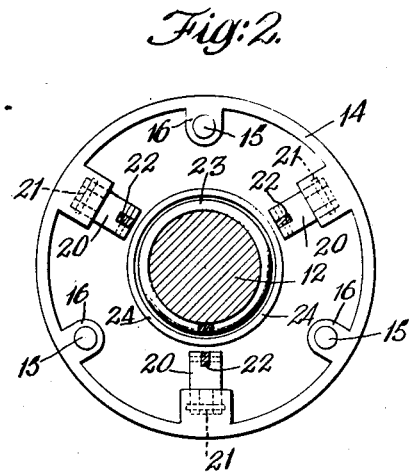
Figure 3:
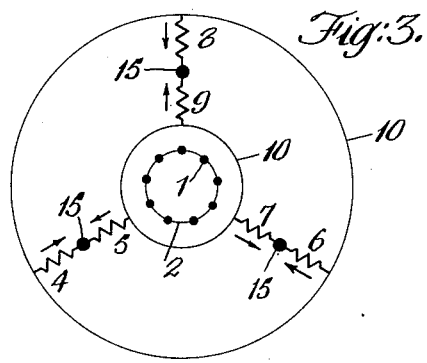
Figure 4:
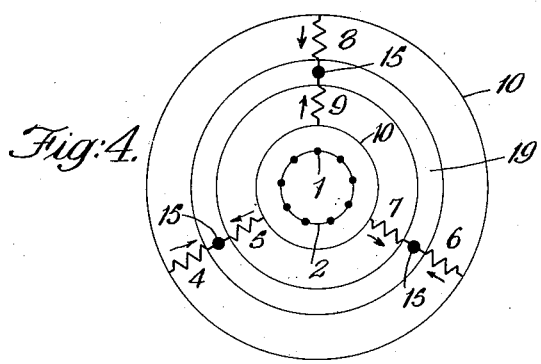
Figure 5:
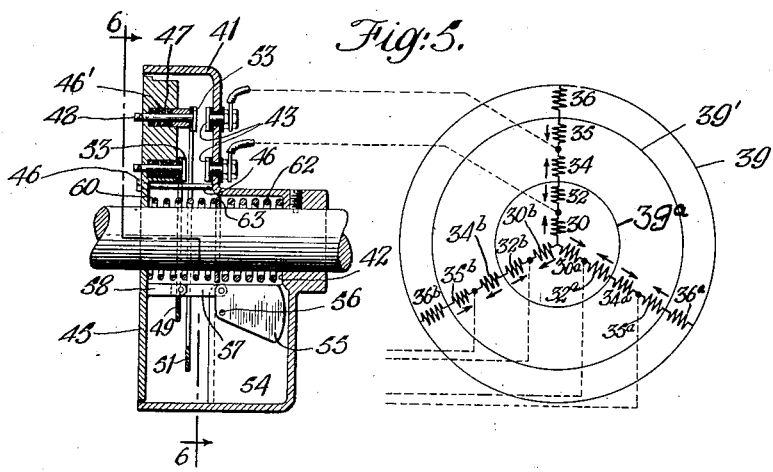
Figure 6:
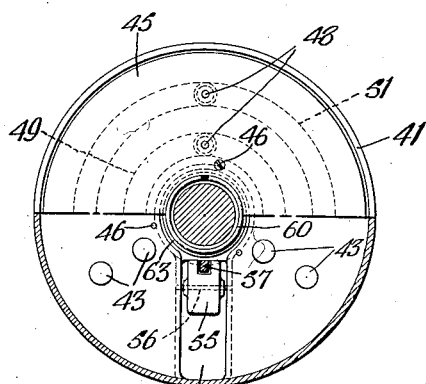

Fig. 1 is a vertical longitudinal section of the motor; Fig. 2 is a vertical section on the line 2—2 of Fig. 1; Fig. 3 is a diagram indicating starting conditions; Fig. 4 is a diagram indicating running conditions; Fig. 5 is a vertical longitudinal section of a modification showing the circuit controlling means in combination with a diagram indicating the windings and circuit connections; and Fig. 6 is an end view partly in section of the construction shown in Fig. 5 on line 6—6.

In the construction illustrated by Figs. 1 to 4, the rotor windings comprise two parts. One part is a winding of the squirrel cage type made up of bars 1 of non-magnetic alloy having a specific resistance higher than that of copper and preferably twice as high or even higher. This winding also includes the short circuiting resistance end rings 2 of metal preferably having a specific resistance greater than that of copper. The bars 1 may be made of bare metal and are brazed or welded to the end rings 2, thus securing a construction which will be durable and rugged. The bars 1 and rings 2 being of material having a comparatively high specific resistance may be made of comparatively large cross section and so have large heat absorption capacity, avoiding injury to the motor from overheating during starting and low speeds and permitting such periods to be longer than in prior constructions.

Insulated from the squirrel cage winding by insulating material 4 is the other part of the rotor winding which is the phase winding 3. This winding is controlled by a centrifugal device hereinafter described.

The bars 1 of the squirrel cage winding are, as shown in Fig. 1, located in the same slots as the phase winding 3 and at the bottom of said slots; and have inwardly bent ends which are connected to the end rings 2, which end rings are of smaller diameter than the squirrel cage winding and thus considerably inwardly displaced from the end turns of the phase winding. The ends of the bars 1 and the rings 2 being displaced from other parts and subjected to air currents due to rotation are adapted to readily dissipate heat therefrom without objectionably heating the phase winding or the end turns thereof.

Referring to the diagrams Figs. 3 and 4 the squirrel cage winding is indicated by the numerals 1 and 2 respectively indicating the alloy bars and alloy end rings. The numerals 4, 5, 6, 7, 8 and 9 indicate the portions of the three-phase winding 3 connected in star by the permanent connection 10. The windings 4 and 5 are in the same phase and preferably have an equal number of turns and are connected in series with each other and in opposition to each other as indicated by the arrows. Windings 6 and 7 are similar to windings 4 and 5 and form another phase of the three-phase winding. Windings 8 and 9 are also similar to windings 4 and 5 and form the third phase of the rotor phase winding. These windings are made of a metal of high conductivity such as copper and are of low resistance.

The electromotive forces generated in the section 4 and the section 5 are equal and as the sections are wound to oppose each other when connected in series, the resultant electromotive force of the leg 4, 5 is zero under the conditions indicated in Fig. 3. Similarly the resultant voltage in the leg or phase 6, 7 and in the phase 8, 9 is zero. It follows that as long as the junction points 15 are not connected to each other, the total voltage generated in the phase winding 3 and the current flowing in the phase winding 3 will be zero. It is evident that under these starting conditions, the only active rotor winding is the squirrel cage winding 1, 2. In view of the high specific resistance of the materials constituting the squirrel cage winding, a high starting torque and a low starting current is obtainable.

After the motor has reached a predetermined speed, the three junction points 15 between each section of the three phase windings are short circuited by conductor 19, as indicated in Fig. 4. Winding sections 4, 6 and 8 are now acting as an independent polyphase winding. Similarly sections 5, 7 and 9 are acting as an independent polyphase winding. There are now three independently short circuited windings on the rotor dividing the load in proportion to their impedances. The motor will now operate under its normal operating conditions as an induction motor having a low resistance rotor, a high efficiency and a low slip.

Referring to Figs. 1 and 2, one form of centrifugal switch is shown for the purpose of short circuiting the three junction points 15. The stator of the motor is shown at 25 having its winding 11 of any of the usual forms of stator windings. The rotor shaft carries the rotor core 13 which in turn carries windings 1 and 3 already described. A housing 14 carried by the rotor shaft at one end of the motor encloses the switch controlling means. Three contacts 15 in substantially the same plane are carried respectively upon three supporting arms 16 extending from the housing 14 which in turn is supported by the central supporting part 17 on the rotor shaft. The contacts 15 are insulated from their supports and at their outer ends each have a connection 18, extending to the rotor windings 3 and thus provide the tap connections to the contacts 15 between the sections of each of the phase windings as already described in connection with Fig. 3. Slidably mounted upon the rotor shaft is a movable switch element 19 in the form of a ring around the shaft and when moved outwardly will engage all three contacts 15 and make a common connection between them as already described in connection with Fig. 4. There being only three contacts 15 engaged by the face of ring 19, a so-called three-point contact is made which insures engagement of ring 19 with each of the contacts 15, as the ring will adjust itself to the plane of the three contacts. Three weights 20 are pivoted respectively on rods 21 which rods are carried by supports extending from the housing 14. A link connection 22 extends between each of these weights 20 and the short circuiting ring 19. A spring 23 which encircles the shaft is enclosed within a sleeve 24 and seats between the ring 19 and the support 17 tending to force the ring 19 out of contact with the switch contacts 15.

In starting, the ring 19 is of course out of contact with the contacts 15 and the starting condition is as already described in connection with Fig. 3. As the speed increases, the weights 20 gradually move outwardly by centrifugal force against a force exerted by spring 23; and when a predetermined speed is attained, the centrifugal force exerted is sufficient to bring the ring 19 in engagement with the contacts 15 and thus cause the rotor windings to be changed from connections for starting to the running connections of Fig. 4.

In the diagram of Fig. 5 a construction is indicated wherein the squirrel cage winding of the above described construction is replaced by a star connected three phase winding 36, 36$^a$ and 36$^b$ which is permanently short circuited by the conductors 39 and 39′. The winding 36, 36$^a$, 36$^b$ will have a high resistance per turn and may be made of alloy of high specific resistance. In this instance also there are shown two sets of opposing windings instead of the one set of the construction first described. Thus in Fig. 5 there is indicated one set of windings 34, 35, 34$^a$, 35$^a$, and 34$^b$, 35$^b$ constituting one set of three phase windings, each phase of which is made up of sections in opposition to each other with a junction point between them. These windings have a permanent connection 39′ and 39$^a$ connecting them in star relationship. Similarly another set of three phase windings 30, 32, 30$^a$, 32$^a$ and 30$^b$, 32$^b$ are provided with the sections of each phase opposing each other and their extremities permanently connected by the conductor 39$^a$ and the common central connection.

In this construction when the motor is started, only the high resistance phase winding is active, because each section of the other windings oppose each other and having equal and opposite electromotive forces result in no current flowing through the opposing sections. But when the motor attains a predetermined speed, a centrifugal governor will cause the junction points between the sections 34 and 35 and between 34ᵃ and 35ᵃ and between 34ᵇ and 35ᵇ to be short circuited whereupon these sections will then act independently and be active in exerting torque and further increasing the speed of the motor. At a higher predetermined speed, the junction points between the sections 30 and 32 and between 30ᵃ and 32ᵃ and between 30ᵇ and 32ᵇ will be connected together or short circuited by the action of the centrifugal governor and these windings will then be brought into effective utilization in further increasing the speed of the motor and giving normal running conditions. Under such conditions all of the rotor windings are effective, dividing the load between them in proportion to their impedances, giving a low resistance rotor with high efficiency and low slip under normal running conditions.

A governor for controlling the two sets of phase windings is shown in Figs. 5 and 6. The rotor shaft carries a housing 41 within which is a disc 45 slidably mounted upon the guide pins 46. This disc has three bosses with spring seats 46′ and in each such spring seat 46′ is a pin 48 registering in position with a corresponding contact 43 and held toward the same by a yielding spring 47. The innermost pins 48 of each radial row are connected to a single ring 49 and this ring 49 carries contact buttons 53 registering in position with the corresponding contacts 43. Another similar ring 51 connects the outer pins 48 and similarly carries contact buttons 53.

The housing 41 has three pockets 54 which alternate in angular position with the rows of contacts 43. In each pocket 54 is a centrifugal weight 55 pivoted on the transverse pin 56 and connected by a link 57 and corresponding stud 58 to the disc 45. Around the rotor shaft within the casing 41 are two helical springs 60, 62 graded in size and strength, 60 being smaller and weaker. The springs are separated by a loose ring 63. The weaker spring 60 presses against the inner face of the disc 45 and the stronger spring 62 presses against the bottom of the spring seat 42. These springs act in tandem tending to hold the disc 45 away from the contacts 43 and in opposition to the centrifugal force exerted by the weights 55. The contacts 43 are insulated from the housing 41 and have the leads from the junction points of the opposing sections of the windings connected respectively to them.

When the motor is at rest, the contacts 43 will be disconnected so that the only effective winding during starting is the high resistance phase winding 36, 36ᵃ, 36ᵇ as already described. At a certain predetermined speed the outer ring 51 will cause the outer contacts 43 to be connected together and thus short circuit the junction points between the sections of the windings 34, 35, 34ᵃ, 35ᵃ, 34ᵇ, 35ᵇ, with the result already described. Upon further increase of speed the ring 49 will cause the inner contacts 43 to be short circuited and consequently result in the remaining set of opposing sections having their intermediate junction points connected together with the result already set forth.

Although I have described certain embodiments of my invention, my invention may be embodied in other forms of construction and varied to suit particular requirements.

I claim:—

1. An induction motor having a rotor comprising a two-part winding, one of said parts being a winding of comparatively high specific resistance, non-magnetic material effective at all times, and the other of said parts being a winding of comparatively low specific resistance and ineffective at starting, the first named part having bars located in the same slots of the rotor with the second named part and at the bottom of said slots, the first named part also comprising end rings to which said bars are connected, said end rings being displaced inwardly from the end turns of said second named part, and means whereby the second named part may be caused to become fully effective after starting.

2. An induction motor having a rotor comprising a two-part winding, one of said parts being a winding of comparatively high specific resistance, non-magnetic material effective at all times, and the other of said parts being a winding of comparatively low specific resistance and ineffective at starting, the first named part having bars located in the same slots of the rotor with the second named part and at the bottom of said slots and bent inwardly at their ends toward the axis of the rotor, the first named part also comprising end rings to which the inwardly bent ends of said bars are connected, said end rings being displaced from the end turns of said second named part, and means whereby the second named part may be caused to become fully effective after starting.

JUSTIN LEBOVICI.